Feb. 26, 1929.
N. R. HAAS
1,703,191
DYNAMO BRUSH
Filed April 14, 1925
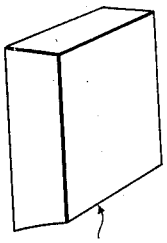
CONTAINS GRAPHITE ARTIFICIAL RESIN
AND A RUBBER VULCANIZATION ACCELERA-
TING COMPOUND
Inventor
Nelson R. Haas
By Spencer, Sewall and Hardman
Attorney Patented Feb. 26, 1929.

1,703,191

UNITED STATES PATENT OFFICE.

NELSON R. HAAS, OF DAYTON, OHIO, ASSIGNOR, BY MESNE ASSIGNMENTS, TO DELCO-REMY CORPORATION, OF DAYTON, OHIO, A CORPORATION OF DELAWARE.

DYNAMO BRUSH.

Application filed April 14, 1925. Serial No. 23,144.

This invention relates to brushes for dynamo electric machines, and methods of manufacturing thereof.

One of the objects of the invention is to make a brush which is more durable than heretofore, and to provide a process of which a more uniform product can be manufactured.

Further objects and advantages of the present invention will be apparent from the following description, reference being had to the accompanying drawing, wherein a preferred form of embodiment of the present invention is clearly shown.

One of the known methods of manufacturing brushes for dynamo electric machines is to mold a mixture of finely divided graphite and resinous material under heat and pressure sufficient to cook or sinter the resinous material and to compress the materials into permanent form. On account of uniformity an artificial resin, such as bakelite, has been preferred. The present invention includes the discovery that when a small quantity of a compound used as an accelerator in the manufacture of rubber is added to the mixture of graphite and resinous material before holding, the molded product will be much harder and more durable than anything heretofore known. Examples of rubber accelerating compounds which have proved satisfactory for the manufacture of brushes are; hexamethylenetetramine, diphenylguanidine, aniline-acid-aldehyde. The following proportions of ingredients have given satisfactory results; 88 parts by weight of graphite, 9 parts resin, 1 to 4 parts of a rubber accelerating compound. The quantity of rubber accelerator required depends on the nature of the substance used. For brush molding purposes some accelerating substances have proved to be more potent than others, consequently the amount required can be reduced. For example a brush molded from the following ingredients was found to have great durability; 88 parts by weight of artificial graphite, 9 parts grade A bakelike, 1½ parts of aniline-acid aldehyde. For a satisfactory durable brush about 3½ parts of diphenylguanidine were required for the same quantities of graphite and resin specified in the proceeding example.

Small quantities of abrasive such as aluminum oxide may be added to the mixture of ingredients already specified. Preferably about 3 parts by weight of abrasive may be added to the quantities of the other ingredients specified in the preceding paragraph.

While the form of embodiment of the present invention as herein disclosed, constitutes a preferred form, it is to be understood that other forms might be adopted, all coming within the scope of the claims which follow.

What is claimed is as follows:

1. A dynamo brush comprising a mixture of graphite, artificial resin and a rubber vulcanization accelerating compound molded under heat and pressure.

2. A dynamo brush comprising a mixture of graphite, bakelite and a rubber vulcanization accelerating compound molded under heat and pressure.

3. A dynamo brush comprising a mixture of graphite, artificial resin and aniline-acid-aldehyde molded under heat and pressure.

4. A dynamo brush comprising a mixture containing by weight 88 parts of graphite, 9 parts grade A bakelite and 1 to 4 parts of a rubber vulcanization accelerator molded under heat and pressure.

5. A dynamo brush comprising a mixture containing by weight 88 parts of graphite, 9 parts grade A bakelite, and 1½ parts aniline-acid-aldehyde molded under heat and pressure.

6. A dynamo brush comprising a mixture containing by weight 88 parts of graphite, 9 parts bakelite, 3 parts of an abrasive and 1½ parts of aniline-acid-aldehyde molded under heat and pressure.

In testimony whereof I hereto affix my signature.

NELSON R. HAAS.